INVENTOR
Donald A. Worden
BY
ATTORNEYS.

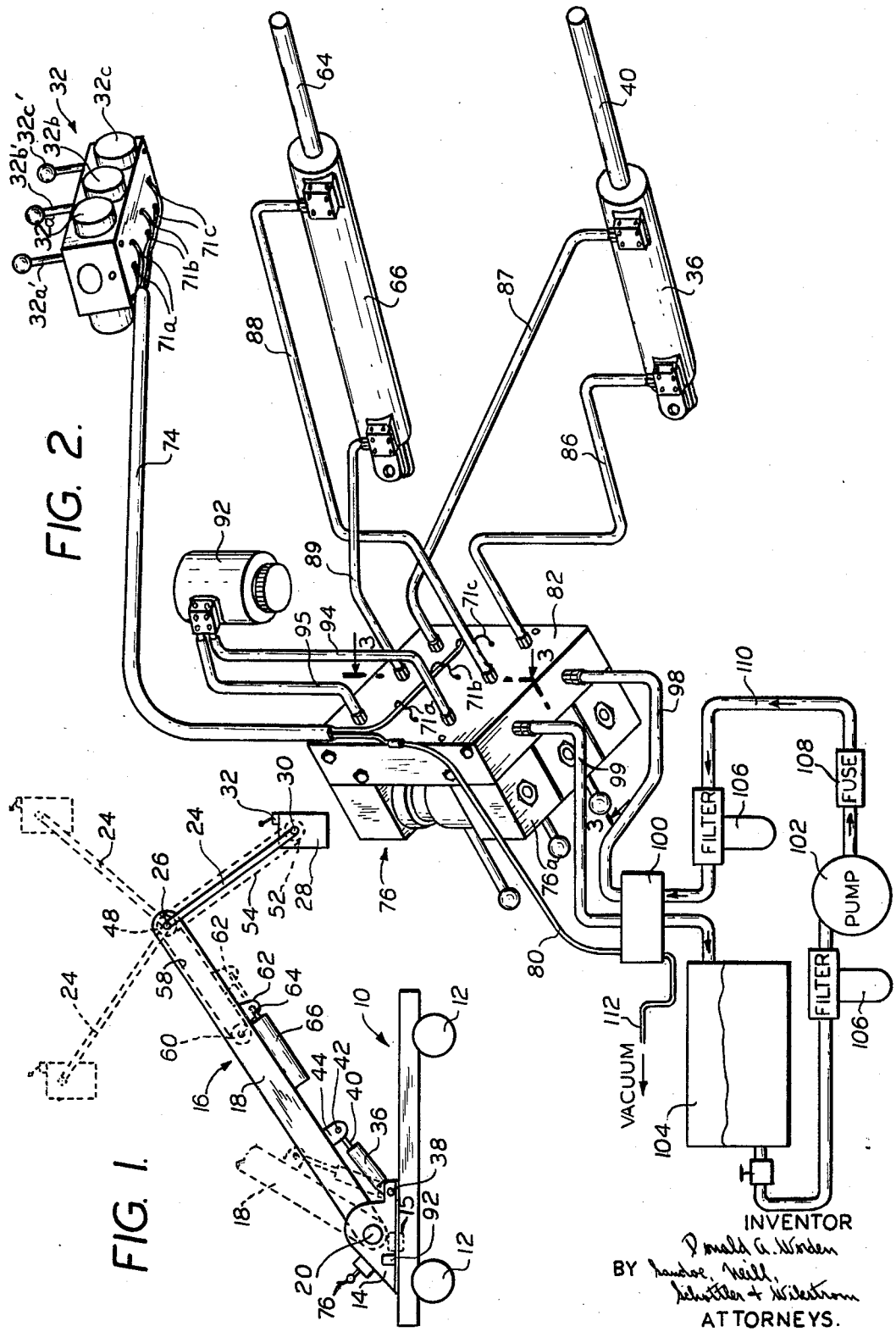

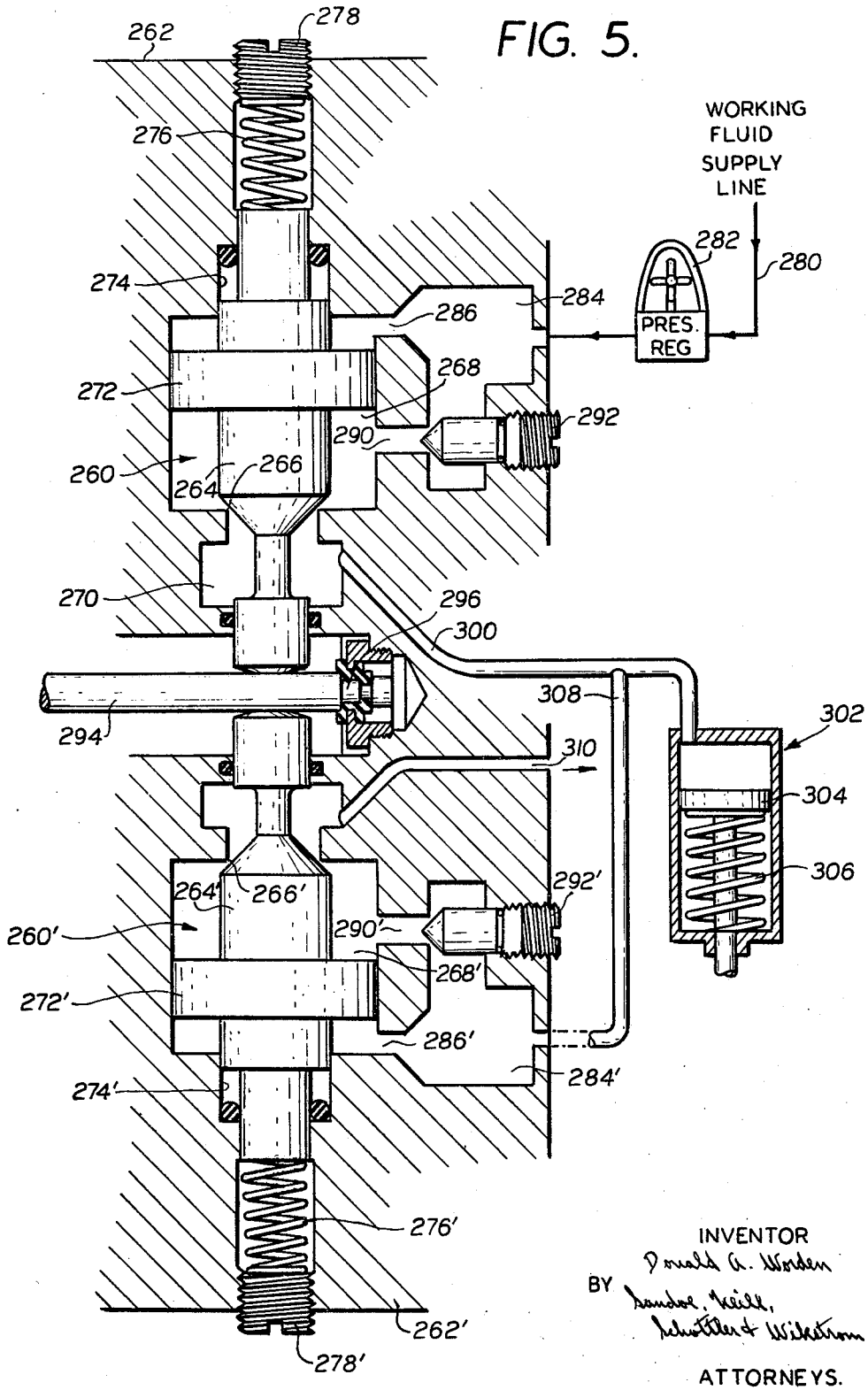

United States Patent Office 3,498,411
Patented Mar. 3, 1970

3,498,411
FLUID ACTUATOR SYSTEM FOR REMOTE CONTROL
Donald A. Worden, Pompton Plains, N.J., assignor to Marotta Valve Corporation, Boonton, N.J., a corporation of New Jersey
Filed Aug. 16, 1967, Ser. No. 661,116
Int. Cl. E04g *1/18, 3/00*
U.S. Cl. 182—148
13 Claims

ABSTRACT OF THE DISCLOSURE

This specification discloses a fluid actuator system having at least one, and usually a plurality, of motors, for performing various functions of the system. In a simple illustrated embodiment of the invention, the system controls the movement of a carriage or "bucket" in which a workman rides for working on overhead telephone or electric power lines, or for pruning trees, or similar operations. The bucket is carried on a conventional jointed boom; and there is one motor for moving the entire boom and another motor for actuating the joint of the boom to shift the upper end, that carries the bucket, with respect to the lower end. The invention includes novel valve means for controlling, from the bucket, the power supply to the motors and for obtaining much more accurate remote control than has previously been possible. Servo motors are used to avoid having to carry high-pressure fluid lines up the boom to the manual controls on the bucket.

BRIEF DESCRIPTION OF THE INVENTION

Trucks having a boom with a man-carrying bucket at the outer end of the boom, are commonly used for working on telephone and power lines; and there are controls on the bucket by which a workman riding in the bucket can control motors to move the boom and to shift the location of the bucket as the work progresses.

This invention provides an improved control system for the motors that shift the position of the bucket in apparatus of the type described. One improvement involves the use of fluid supply valves operated by remote controlled actuators, and with means for adjusting the return of working fluid supplied to the motors to prevent overtravel of the boom and bucket, a common defect in present systems.

Another improvement is the operation of hydraulic fluid supply valves by pneumatic motors with remote control of the latter from the bucket. This makes it unnecessary to carry high pressure fluid hoses up the boom; and it also prevents any spilling of oil, or other high-pressure fluid, in the event that a line on the boom ruptures or leaks. In a system using air as the working fluid, there is no danger or serious damage if the hoses to the remote control break or leak.

Although this invention is illustrated herein as applied to controls for a bucket at the free end of a jointed boom, it can be used in many other embodiments. In its broader aspects, the invention is an improved fluid actuator system with controls for one or more motors, each of which exerts the force to perform a different function in the system.

Other objects, features and advantages of the invention will appear or be pointed out as the description proceeds.

BRIEF DESCRIPTION OF THE DRAWING

In the drawing, forming a part hereof, in which like reference characters indicate corresponding parts in all the views:

FIGURE 1 is a diagrammatic view of a truck having a jointed boom with a man-carrying bucket connected with the upper end of the boom and having remote control means for controlling the motors that actuate the boom;

FIGURE 2 is a diagrammatic piping diagram for the apparatus shown in FIGURE 1;

FIGURE 5 is a diagrammatic view showning a simplified form of the invention for use with a single acting motor.

DETAILED DESCRIPTION OF THE INVENTION

Figure 3:
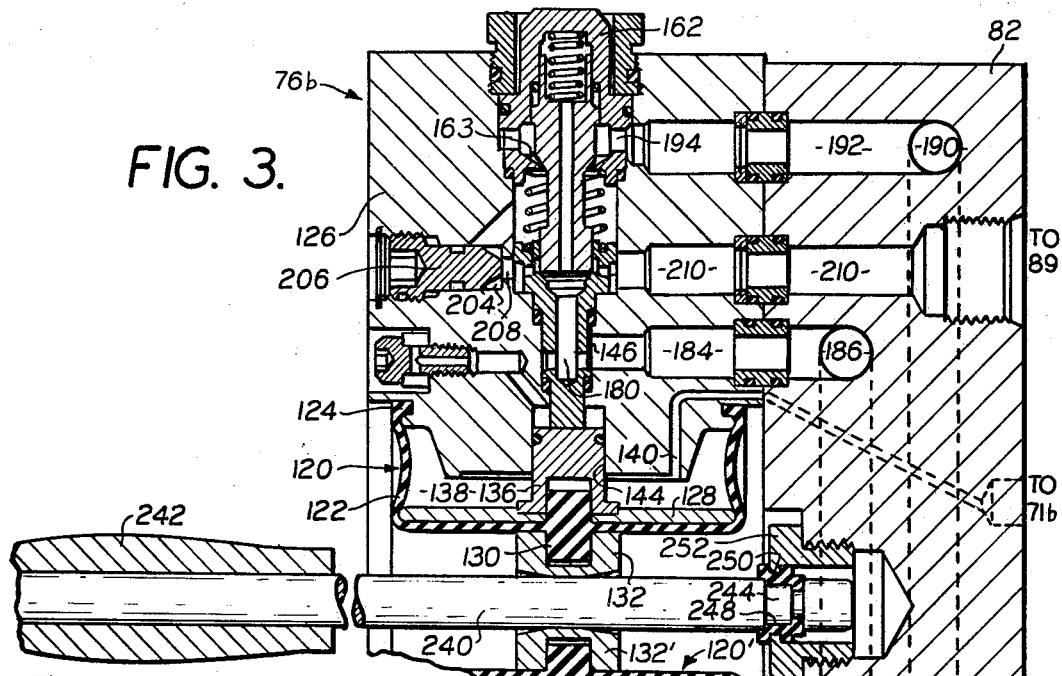
FIGURE 3 is a greatly enlarged sectional view, taken on the plane 3—3 of FIGURE 2.

FIGURE 1 shows a truck 10 having wheels 12 and a rigid frame 14 attached to the truck for holding the lower end of a boom 16. This frame 14 is rotatable about a center stud 15 to swing the boom about a vertical axis. The control of the rotation about the stud 15 will be described in connection with FIGURE 2.

The boom 16 is jointed and comprises a lower boom section 18 which is attached to the truck 10 by a pivot connection 20.

The boom 16 has an upper boom section 24 connected with the lower boom section by a pivot connection 26. A bucket 28 is pivotally connected to the boom section 24 by pintles 30. There are manually actuated controls 32 on the front of the bucket 28 in a convenient position for manipulation by a workman riding in the bucket.

A cylinder-and-piston motor 36 has its cylinder connected with the frame 14 by a pivot connection 38. The motor 36 has a piston rod 40 connected, by a pivot connection 42, to a lug 44 which is rigidly secured to the lower boom section 18. Operation of the motor 36 to move its piston toward the crank end of the cylinder causes the lower boom section 18 to swing upward as indicated in dotted lines in FIGURE 1.

The pivot connection 26 is a shaft with a sprocket wheel 48 secured to it, and the upper boom section 24 is also secured to this same shaft so that as the sprocket wheel 48 rotates, the boom section 24 swings angularly about the pivot connection 26, as indicated by the various dotted-line positions shown in FIGURE 1. There is another sprocket wheel 52 attached to the bucket 28. This sprocket wheel 52 is of the same diameter as the sprocket wheel 48 and is connected with it by an endless belt or chain 54 so that as the boom section 24 moves angularly about the pivot connection 26, the bucket 28 always remains in a vertical position.

Another sprocket wheel, similar to the sprocket wheel 48, is secured to the shaft which forms the pivot connection 26 and this second sprocket wheel is connected by a belt or chain 58 to a sprocket wheel 60 carried by an axle attached to the boom section 18.

A lug 62 is attached to the chain 58 and this lug 62 is also attached to a piston rod 64 of a cylinder-and-piston motor 66 carried by the boom section 18. Operation of the motor 66 moves the lug 62 and the chain 58 so as to rotate the shaft comprising the pivot connection 26, and by rotating this shaft, to swing the upper boom section 24 into any desired position.

The motors 36 and 66 are preferably hydraulic motors and the supply of working fluid to and from these motors is controlled by valve means which are operated by servo motors which are, in turn, supplied with working fluid by the manually actuated controls 32 on the bucket.

The apparatus shown in FIGURE 1 is a diagrammatic showing of a conventional bucket truck to which the present invention is applied. It is also representative of a system having a plurality of motors with a different motor for performing each function of the system and with remote control means for the motors.

FIGURE 2 shows the manually actuated controls 32 as consisting of three controls 32a, and 32b and 32c. These are preferably identical controls ganged together to make the composite manually actuated controls 32. Each of the controls 32a, 32b and 32c has a handle 32a', 32b', and 32c'. Operation of each handle in one direction opens a valve that controls passage of working fluid through the associated control; and operation of the handle 32 in the other direction closes the valve.

The detailed construction of the controls 32 forms no part of the present invention, and it is sufficient to understand that there are two tubes 71a leading to the control 32a. Similarly there are two tubes 71b and two tubes 71c leading to the controls 32b and 32c, respectively.

These tubes 71a, 71b and 71c extend through a protecting shield 74 which leads from the bucket along the boom to motor controls 76 at a fixed location on the frame 14. It will be understood that flexible hoses can be used for the tubes 71a, 71b and 71c with the necessary slack to permit the movements of the boom; or the tubes can have joints in line with the axes of movement of the boom, if desired. Flexible hoses are preferred.

In the system illustrated in FIGURE 2, the servo motors in the motor controls 76 are vacuum-operated. There is a vacuum line 80 which connects with one of each of the tubes 71a, 71b and 71c. The other one of each of the tubes 71a, 71b and 71c is connected with a port on a block 82, as indicated by the reference characters 71a', 71b', and 71c'. When all of the valves in the manually actuated controls 32 are closed, the vacuum in the line 80 cannot draw air from the block 82 through any of the lines 71a, 71b and 71c, but if any one of the valves in the controls 32a, 32b and 32c is open, the line 80 withdraws air from the corresponding line 71a, 71b or 71c to actuate a corresponding servo motor of the motor controls 76, which will be explained in connection with FIGURE 3.

The motor 36 has working fluid lines 86 and 87 connected with it at opposite ends and leading to ports in the block 82. The motor 66 has working fluid lines 88 and 89 connected with its opposite ends and leading to ports in the block 82. A motor 92, which rotates the frame 14 of FIGURE 1 to swing the boom about a vertical axis, has working fluid lines 94 and 95 leading to ports of the block 82.

The headers for supply and exhaust of working fluid in the motor controls 76 are connected with working fluid lines 98 and 99 leading through a rotary joint 100 to a pump 102 and a working fluid reservoir 104. There are filters 106 and a fuse 108 in the piping system 110 through which the working fluid is drawn from the reservoir 104 and supplied to the working fluid pressure line 98. The line 80 connects through the rotary joint 100 with a vacuum line 112 leading to a vacuum pump.

The motor controls 76 consist of three separate control units 76a, 76b and 76c. These control units are preferably of identical construction and they are connected to the block 82. Where there are more than three motors to be controlled, a larger block 82 is used, having accommodations for as many of the individual controls units similar to the units 76a, 76b and 76c as are necessary.

Although each of the control units 76a, 76b and 76c contains servo motor means for moving valves to control the flow of working fluid to the respective motors 36, 66 and 92, these control units 76a, 76b and 76c also have handles 76a', 76b', and 76c' which can be used as a manual override for the remote controls on the bucket. These handles 76a', 76b', and 76c' are used to operate the boom when there is no workman riding in the bucket. For example, sometimes the boom is used to hoist a load, such as a transformer, and there is no workman riding in the bucket.

FIGURE 3 shows a control 76b. It includes a motor 120 comprising a flexible boot 112 with an edge bead 124 that snaps into a circumferential groove of a valve housing 126. There is a plate 128 that stiffens the end wall of the boot 122, and there is a stud 130 of the boot extending through the plate 128 in one direction and extending into a cap 132 in the other direction. The boot 122 is preferably made of rubber or similar material. Beyond the plate 128, the stud 130 extends into a bore in the end of a plunger 136.

The lower end of the boot 122 is spaced from the end of the valve housing 126 so as to form a chamber 138. Air is withdrawn from this chamber 138 through a passage 140 which connects with the line 71b which is in communication with the vacuum line 112 (FIGURE 2) through the valve in the control 32 on the bucket when that control is operated to open its valve. As higher and higher vacuum is drawn on the chamber 138, the atmosphere outside of the boot 122 pushes the end of the boot and the plate 128 upward to collapse the chamber 138 and to slide the plunger 136 upward in a guide 144.

A seat element 146 has a stem 148 (FIGURE 4) which slides in guides 150, 152 and 154. A valve element 156 has a tapered bottom face 158 which seats against a complemntary face of the upper end of the seat element 146. The valve element 156 is urged downward by a spring 160. The spring 160 fits into a recess in the upper part of the valve element 156, and the spring 160 is compressed by a fitting 162 in the upper end of the valve housing 126.

There is another valve seat 163 in the fitting 162 near the lower end of this fitting 162; and there is a tapered face 164 of valve element 156 that contacts with the seat 163 when the valve element 156 closes against the seat 163. The seat element 146 is urged downward by another spring 166. This spring 166 fits into a recess in the upper end of the seat elements 146 and is compressed by the lower end of the valve element 156.

There is a nut 170 threaded into a counterbore 172 in the upper end of the valve housing 126. This nut 170 fits around the upper end of the fitting 162 and bears against a shoulder 174 of the fitting 162 to hold the fitting in the valve housing. A shoulder 176 limits the extent to which the fitting 162 can be inserted into the housing 126; and there are sealing rings 178 at different locations along the fitting 162 including a ring between the shoulder 176 and a complementary annular face of the fitting 162.

There are other sealing rings 178, preferably O-rings, at various locations along the valve element 156 and seat element 146 where needed. The seat element 146 has a center passage 180 which extends from the upper end of the valve seat downward to angularly spaced ports 182 that open through the circumference of the stem 148 of the seat element 146. These ports 182 establish communication between the center passage 180 and a passage 184 leading to a header 186 (FIGURE 3) in the block 82. Another header 190 in the block 82 communicates through a passage 192 with a port 194 opening through the wall of the fitting 162. There are preferably four ports 194 located at 90° spacing around the circumference of the fitting 162, and there is a circumferential groove 196 (FIGURE 4) in the fitting 162 so that all of the ports 194 can communicate with the passage 192.

The portion of the valve element 156 which passes through the opening in the lower end of the fitting 162 is of substantially smaller diameter than the opening so that fluid entering the interior of the fitting 162 through the ports 194 can flow freely into the space below the fitting 162. This space provides a chamber 200, and the chamber has a port 202 opening into a needle valve chamber 204 in which there is a needle valve 206 movable toward and from a bleed port 208 leading into the space around the seat element 146 which communicates with a passage 210 leading to the line 89, as shown in FIGURE 3.

The needle valve 206 screws along threads 214 in a counterbore in one side of the valve housing 126. There is a socket 216 in the outer end of the needle valve 206 for receiving a wrench or key for rotating the needle valve to move it toward and from the seat provided by the edge of the opening or port 208. Thus the rate of flow of fluid through the port 208 can be regulated by moving the needle valve 26 toward and from the end of the port 208.

There is a vent passage 220 for the flow of air toward and from the space above the plunger 136. This vent passage 220 communicates with a bushing 222 having openings leading into a filter 224; and the filter 224 is exposed at its outside to the ambient atmosphere. Provision is also made for venting the space above the valve element 156 and this venting is accomplished by providing a passage 230 opening through the lower end of the valve element 156 and communicating with the space above the valve element.

When the ports are in the position shown in FIGURE 3, the plunger 136 is in its lowermost position, being held there by pressure of the spring 166 exerted through the seat element 146 and its stem 148. The valve element 156 is closed against the valve seat 163 and this is the limit of the downward movement of the valve element 156. The spring 166, in pushing the seat element 146 downward into the position shown in FIGURE 3, moves the seat element 146 away for the lower end of the valve face 158 of valve element 156 and leaves space for the flow of fluid from the cylinder line 189 through the passage 210 and into the space around the seat element 146. The fluid flows over the top of the seat element 146 and downward through the passage 180 and out through the ports 182 into the passage 184 which leads to the exhaust header 186.

Figure 4:
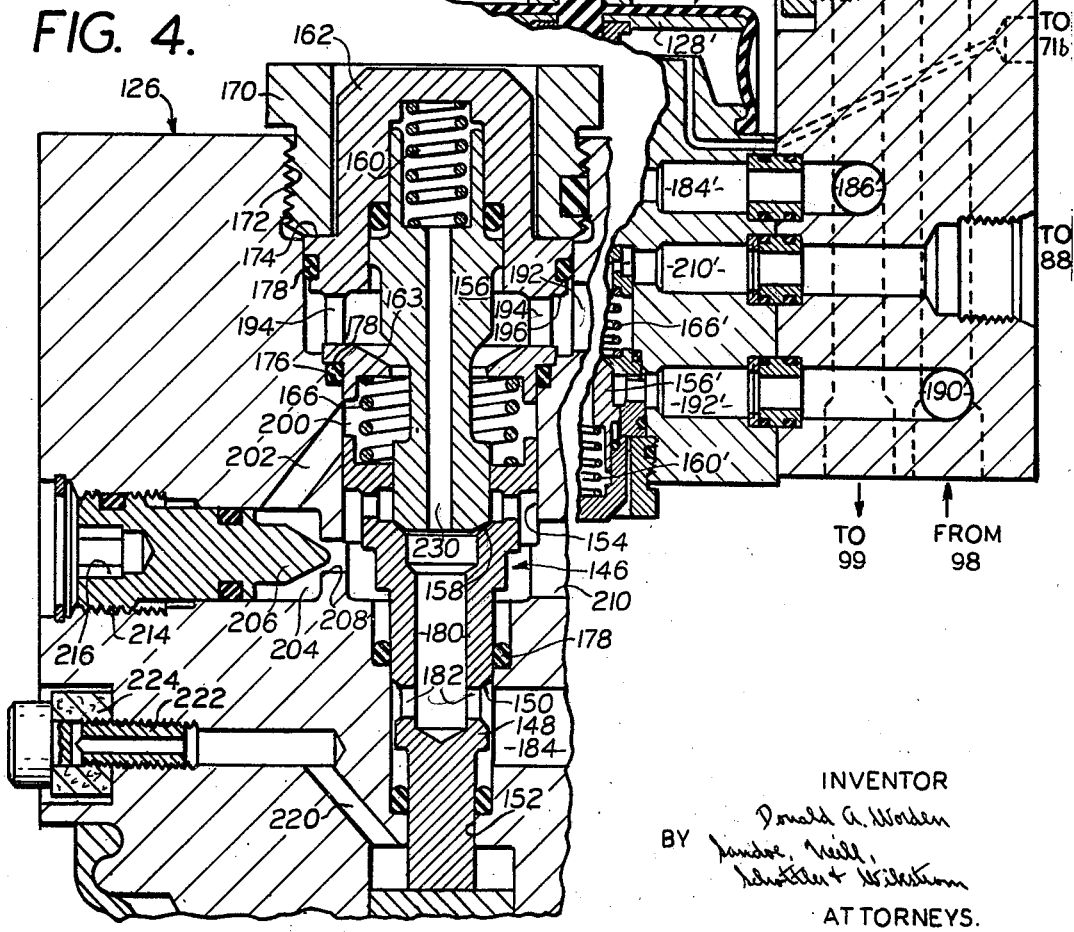
FIGURE 4 is an enlarged sectional view of a portion of the structure shown in FIGURE 3 but with the valve means in a different position.

When the parts are in the positions shown in FIGURE 4, with the stem 148 and seat element 146 in their raised positions, the seat element 146 is in contact with the tapered face 158 of the valve element 156 so that no fluid can enter the passage 180. In moving upward into the position shown in FIGURE 4, the seat element 146 pushes the valve element 156 upward against the pressure of the spring 160 and lifts the valve 158 from the valve seat 163. Fluid is then free to flow from the fluid pressure header 190 through the passage 192 and ports 194, and through the clearance between the valve elements 156 and the valve seat 163. This fluid flow enters the chamber 200 and flows through the port or passage 202 into the bleed valve chamber 204. From the chamber 204, the fluid flows through the port 208 into the space around the seat element 146 and out through the passage 210 to the line 89 (FIGURE 3) leading to the cylinder.

Thus upward movement of the plunger 136 puts the cylinder line 89 in communication with the header 190 containing working fluid under pressure; and downward movement of the plunger 136 puts the cylinder line 89 in communication with the exhaust header 186.

The pressure at which working fluid is supplied to the ports 194 depends upon the pump 102 and any other apparatus that affects the pressure of working fluid in the supply line 98. The rate of flow of the working fluid to the passage 210 and to the cylinder-and-piston motor 66 (FIGURE 2), is proportional to how wide the valve element 156 opens; i.e., upon the clearance between the valve element 156 and the valve seat 163; and this, in turn, depends upon the force applied to the valve element to open it.

For example: if a valve-opening force of 40 pounds produces a working fluid flow of four gallons per minute, then a force of one pound produces a film of 0.1 gallon per minute; but the proportion of valve-operating force to flow is adjustable by changing the setting of the bleed valve 206.

For greater accuracy of control, the bleed valve 206 is moved toward closed position so that greater force has to be applied to the valve element 156 in order to obtain a given flow of working fluid to the cylinder-and-piston motor 66 (FIGURE 2).

The control of working fluid to and from the cylinder line 88 is controlled by valve means similar to those shown in FIGURES 3 and 4 but located in the lower part of the control 76b, the parts being turned upside-down with respect to those shown in FIGURE 3. The corresponding parts for controlling flow to and from the line 88, where shown in FIGURE 3, are indicated by the same reference characters as for the valve means for line 89, but with a prime appended.

The manual override for the motors 120 and 120' consists of a handle 240 with a grip 242, at its outer end, and with a circumferential groove 244 near its inner end. This grove 244 is gripped in a resilient collar 248 which is held by a flange 250 of a bushing 252 that is threaded into the block 82. The handle 240 is free to swing on the collar 248 as a fulcrum when the grip 242 is moved upward or downward.

The caps 132 and 132' of the motors 120 and 120', respectively, contact with opposite sides of the handle 240. Thus upward movement of the handle 240 has the same effect as drawing a vacuum on the chamber 138 of the motor 120; and the downward movement of the handle 240 has the effect of drawing a vacuum on the motor 120'. Even though the boot of either of these motors 120 and 120' may be filled with air at the time when the handle 240 is operated, there is sufficient volume in the boots of these motors to permit the air to be compressed to the extent necessary to lift the plunger 136 or to depress the corresponding plunger of the lower valve means sufficiently to operate the valve.

When the motor 120 or 120' has been operating from the remote control on the bucket by drawing a vacuum on these motors, the handle 240 is not effective for pulling either motor back to its original position, but when the control is to be operated by the handle 240, the remote control valves are closed and there is no vacuum drawn on the motors 120 and 120'.

FIGURE 5 shows a simplified form of the invention for use with a single acting motor. Valve means 260, in a housing 262, include a valve element 264 which closes against a seat 266 to shut off flow from a chamber 268 to a lower chamber 270 in the housing 262. The valve element 264 has a flange or piston portion 272 which slides in the chamber 268. The upper end of the valve element 264 has a portion which slides in a guide bearing 274, and a stem which extends into a chamber enclosing a helical spring 276.

The spring 276 is compressed against the stem at the upper end of the valve element 264 by a plug 278 threaded into the housing 262. The force of the spring 276 can be adjusted by screwing the plug 278 one way or the other along threads in the chamber which contains the spring 276.

Working fluid from a supply line 280 flows through a pressure regulator 282 into a chamber 284 in the valve housing. This chamber 284 communicates with the chamber 268 above the piston portion 272 through a port 286. The chamber 284 communicates with the chamber 268 below the piston portion 272 through a port 290. The port 290 is commanded by a bleed valve 292 which threads into an opening through the side of the housing 262. The effective cross section of the port 290 can be increased or decreased by screwing the bleed valve 292 one way or the other along its threads in the opening through the housing.

The value element 264 is moved into open position, against the force of the spring 276, by an actuator 294 which moves angularly about a fulcrum 296 in the housing 262. When force is applied in an upward direction to the actuator 294, and this force exceeds the force of the spring 276, the valve element 264 is lifted from the seat 266.

The extent of opening of the valve element 264 depends upon the amount of force applied to the actuator 294 because the force of the spring 276 increases as the spring is compressed and the force must be increased as necessary to overcome the additional pressure of the spring 276 if the valve element 264 is to be opened further. Thus the spring 276 provides resilient means urging the valve element toward closed position and exerting a progressively greater force tending to close the valve element as the valve element moves into wider open positions.

The chamber 270 has a passage 300 which leads to the upper end of a cylinder-and-piston motor 302. This motor 302 is shown as a single acting motor with a piston 304 which is urged toward the head end of the cylinder by a compression spring 306. When the actuator 294 lifts the valve element 264 from its seat 266, working fluid flows from the chamber 268 into the chamber 270 and through the pasage 300 to displace the piston 304 of the cylinder-and-piston motor 302 in a power stroke.

For exhaust of working fluid from the motor 302, there is a branch passage 308 leading from passage 300 to a housing 262' which is similar to the housing 262 and which contains similar valve means, corresponding parts of which are indicated by the same reference characters as in housing 262, but with a prime appended.

The branch passage 308 opens into the chamber 284'. The valve element 264' is opened when the actuator 294 is moved in the opposite direction to that required to open the valve element 264. Exhaust of working fluid from the motor 302 can take place only when the valve element 264' is in open position so that working fluid can flow from the chamber 268' to the chamber 270' from which the working fluid escapes through an exhaust passage 310. The actuator 294 does not start the opening movement of the valve element 264' until the valve element 264 reaches its fully-closed position.

The pressure supplied to the motor 302 depends upon the pressure of the working fluid from the supply line 280. This working fluid pressure is adjustable by the pressure regulator 282. When there is no flow of fluid, the piston portion 272 is subject to the same pressure against its upper and lower faces. The extent of opening of the valve element 264 is proportional to the actuator 294, as previously explained; but when the valve 264 is open, there is a pressure drop across the bleed valve 292 at the port 290 and this reduces the pressure under the piston portion 272 while the pressure on top of the piston portion 272 remains the same. Thus the degree of opening of the valve element 264, for any particular force of the actuator 294, is dependent not only on the compression of the spring 276, but also upon the adjustment of the bleed valve 292.

As in the case of the valve means shown in FIGURES 3 and 4, if an actuator force of 40 pounds produces a working fluid flow of four gallons per minute then a force of one pound will open the valve element 262 sufficiently to produce a flow of 0.1 gal. per minute for a particular adjustment of the bleed valve 292. However, the proportion of the valve-operating force to the flow of working fluid is adjustable by changing the setting of the bleed valve.

The preferred embodiment of the invention has been illustrated and described, but changes and modifications can be made and some features can be used in different combinations without departing from the invention as defined in the claims.

What is claimed is:

1. A fluid actuator system including a fluid-operated motor that exerts a force to perform a function of the system, valve means that control the flow of working fluid to the motor, resilient means urging the valve means toward closed position and exerting progressively greater force tending to close the valve means as the valve means move into wider open positions, the rate of flow of working fluid to the motor being proportional to the extent to which the valve means open against the force of said resilient means, servo motor means for applying a controlled reference force to the system in a direction to cause the valve means to open to a degree proportional to the reference force, a pump for supplying working fluid to or from the servo motor means, and remote operator-actuated valve means for controlling the rate of flow of the working fluid for the servo motor means.

2. The fluid actuator system described in claim 1 characterized by there being a number of fluid-operated motors for performing different functions, a different valve means for control of each of the motors, and supporting means for the valve means, said supporting means including a pressure header and an exhaust header to which all of the valve means are connected.

3. The fluid actuator system described in claim 4 characterized by the controllers being of similar modular construction and the support having spaced connections to the headers whereby different numbers of controllers can be added to the supporting means.

4. The fluid actuator system described in claim 1 characterized by there being a plurality of fluid-operated motors, different valve means for each motor, a different servo motor for operating each of the valve means, and different operator-actuated valve means for each servo motor at a remote location from the servo motor, and connections between the operator-actuated valve means and the servo motors for operating the respective servo motors in response to operation of their associated operator-actuated valve means.

5. The fluid actuator system described in claim 6 characterized by there being two tubes connecting each of the remotely located operator-actuated valve means with each of the servo motors for operating the servo motors in opposite directions.

6. The fluid actuator system described in claim 6 characterized by there being operator-actuated means at each servo motor as well as at the remote locations, the operator-actuated means at each servo motor being an override device for operating the servo motors independently of the remote operator-actuated valve means, said override device being a lever located between the different valves that supply working fluid to the opposite ends of each cylinder, said lever being in position to selectively operate the different valves when rocked in opposite directions.

7. The fluid actuator system described in claim 4 characterized by the fluid-operated motors being double-acting cylinder-and-piston hydraulic motors with a hydraulic fluid passage leading to each end of each hydraulic motor cylinder, the valve means for each motor having a different valve for supplying working fluid to each end of the cylinder, and each valve having a portion movable into position to exhaust working fluid from one end of the cylinder when the valve is in position to supply working fluid to the other end of the cylinder.

8. A fluid actuator system including a first hydraulic motor, a lower boom to which the first hydraulic motor is operatively connected and which is moved angularly about a fulcrum by said first motor, a second hydraulic motor, an upper boom to which the second motor is operatively connected, the upper boom being connected with the lower boom and being movable angularly with respect to the lower boom by the second motor, a carrier for a workman on the upper boom, controllers including valve means on the carrier in position to be operated by a workman in the carrier, other valve means remote from the carrier and controlling the flow of hydraulic fluid to and from the motors, servo motors connected with the other valve means for operating said other valve means, resilient means urging the first valve means toward closed position and exerting progressively greater force tending to close said other valve means as said other valve means move into wider open positions, said other valve means being poppet valves whereby the supply of working fluid to the motors is proportional to the extent to which said other valve means are open against the force of said resilient means.

9. The fluid actuator system described in claim 8 characterized by each of said other valve means being operated by a different servo motor, an operator-actuated override for operating both of said other valve means independently of the servo motors, said operator-actuated override being held in a mid position by the resilient means that urges both of the valve means into closed position, and the operator-actuated override being movable in different directions to cause the different valve means to move into closed positions.

10. A fluid actuator system including a fluid-operated motor that exerts a force to perform a function of the system, valve means that control the flow of working fluid to the motor, resilient means urging the valve means toward closed position and exerting progressively greater force tending to close the valve means as the valve means move into wider open positions, the supply of working fluid to the motor being proportional to the extent to which the valve means open against the force of said resilient means and operator-actuated means for applying a controlled reference force to the system in a direction to cause the valve means to open to a degree proportional to the reference force, characterized by there being a plurality of fluid-operated motors, different valve means for each motor, a different servo motor for operating each of the valve means, and different operator-actuated means for each servo motor at a remote location from the servo motor, and connections between the operator-actuated means and the servo motors for operating the respective servo motors in response to operation of their associated operator-actuated means, and further characterized by the fluid-operated motors being hydraulic motors, and the valve means controlling the supply of hydraulic fluid to the hydraulic motors, the servo motors being pneumatic motors, the connections between the operator-actuated means and the servo motors being tubing and the operator-actuated means being valves for controlling the flow of pneumatic fluid in said tubing.

11. A fluid actuator system including a fluid-operated motor that exerts a force to perform a function of the system, valve means that control the flow of working fluid to the motor, resilient means urging the valve means toward closed position and exerting progressively greater force tending to close the valve means as the valve means move into wider open positions, the supply of working fluid to the motor being proportional to the extent to which the valve means open against the force of said resilient means and operator-actuated means for applying a controlled reference force to the system in a direction to cause the valve means to open to a degree proportional to the reference force, characterized by the fluid-operated motor being a hydraulic motor, and there being a plurality of motors for performing different functions of the system, different valve means for each motor, each of the valve means having a valve element that opens and closes in proportion to the operation of said operator-actuated means and having another valve in series with said valve element, and means for adjusting said other valve element to limit the cross section of the flow passage commanded by the first valve element.

12. A fluid actuator system including a first hydraulic motor, a lower boom to which the first motor is operatively connected and which is moved angularly about a fulcrum by said first motor, a second hydraulic motor, an upper boom to which the second motor is operatively connected, the upper boom being connected with the lower boom and being movable angularly with respect to the lower boom by the second motor, a carrier for a workman on the upper boom, controllers including valve means on the carrier in position to be operated by a workman in the carrier, other valve means remote from the carrier and controlling the flow of hydraulic fluid to and from the motors, pneumatic motors connected with the other valve means for operating said other valve means, and tubing connecting the valve means on the carrier with the pneumatic motors for operating the other valve means that control the hydraulic fluid, said tubing extending along the booms.

13. The fluid actuator system described in claim 12 characterized by said other valve means being at a location removed from the booms.

References Cited

UNITED STATES PATENTS

| 2,836,467 | 5/1958 | Myers | 182—2 |
| 3,132,718 | 5/1964 | Pierce | 182—2 |
| 3,301,346 | 1/1967 | Verrell | 182—2 |

REINALDO P. MACHADO, Primary Examiner

U.S. Cl. X.R.

182—2

UNITED STATES PATENT OFFICE
CERTIFICATE OF CORRECTION

Patent No. 3,498,411  March 3, 1970

Donald A. Worden

It is certified that error appears in the above identified patent and that said Letters Patent are hereby corrected as shown below:

Column 8, line 17, claim reference numeral "4" should read -- 2 --; lines 33 and 38, claim reference numeral "6", each occurrence, should read -- 4 --.

Signed and sealed this 8th day of December 1970.

(SEAL)
Attest:

Edward M. Fletcher, Jr.
Attesting Officer

WILLIAM E. SCHUYLER, JR.
Commissioner of Patents